United States Patent
Habboosh et al.

(10) Patent No.: US 8,174,435 B2
(45) Date of Patent: May 8, 2012

(54) METHODS AND APPARATUS FOR NON-ISOTROPIC SEA CLUTTER MODELING

(75) Inventors: Amir W. Habboosh, Somerset, MA (US); Nicholas F. Willis, E. Greenwich, RI (US); Thomas E. Wood, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 114 days.

(21) Appl. No.: 12/791,038

(22) Filed: Jun. 1, 2010

(65) Prior Publication Data

US 2011/0291877 A1   Dec. 1, 2011

(51) Int. Cl.
*G01S 13/00*   (2006.01)
(52) U.S. Cl. ............... 342/159; 342/91; 342/205
(58) Field of Classification Search .......... 342/91, 342/93, 159–164, 205
See application file for complete search history.

(56) References Cited

U.S. PATENT DOCUMENTS

| | | | | |
|---|---|---|---|---|
| 3,806,923 A * | 4/1974 | Tsuruta et al. | ................ | 342/92 |
| 4,386,353 A * | 5/1983 | Bleijerveld et al. | ............ | 342/91 |
| 4,394,658 A * | 7/1983 | Short, III | ................ | 342/99 |
| 4,542,381 A * | 9/1985 | Wilhelm | ................ | 342/93 |
| 4,684,950 A * | 8/1987 | Long | ................ | 342/94 |
| 4,766,435 A * | 8/1988 | Wells | ................ | 342/82 |
| 4,780,720 A * | 10/1988 | Watts | ................ | 342/91 |
| 4,837,579 A * | 6/1989 | Pease et al. | ................ | 342/197 |
| 5,177,487 A * | 1/1993 | Taylor et al. | ................ | 342/159 |
| 5,327,141 A * | 7/1994 | Sheldon | ................ | 342/159 |
| 5,337,055 A * | 8/1994 | Ghignoni | ................ | 342/93 |
| 5,451,961 A * | 9/1995 | Rubin et al. | ................ | 342/159 |
| 5,546,084 A * | 8/1996 | Hindman | ................ | 342/25 F |
| 5,546,089 A | 8/1996 | Talbot | | |
| 5,576,712 A | 11/1996 | Bian et al. | | |
| 5,686,919 A * | 11/1997 | Jordan et al. | ................ | 342/26 D |
| 5,754,140 A | 5/1998 | Starr et al. | | |
| 5,900,835 A | 5/1999 | Stein | | |
| 6,038,526 A | 3/2000 | Stein | | |
| 6,130,639 A * | 10/2000 | Agnesina et al. | ............ | 342/169 |
| 6,188,350 B1 | 2/2001 | Neumerkel et al. | | |
| 6,911,933 B1 | 6/2005 | Mutz et al. | | |
| 7,006,031 B1 | 2/2006 | Abatzoglou et al. | | |
| 7,079,991 B2 | 7/2006 | Li et al. | | |
| 7,259,715 B1 * | 8/2007 | Garren et al. | ................ | 342/179 |

(Continued)

FOREIGN PATENT DOCUMENTS

WO   WO95/13547   5/1995

OTHER PUBLICATIONS

Notification of transmittal of the International Search Report dated Aug. 26, 2008, PCT/US2008/053261, 2 pages.

(Continued)

*Primary Examiner* — Thomas Tarcza
*Assistant Examiner* — Peter Bythrow
(74) *Attorney, Agent, or Firm* — Daly, Crowley, Mofford & Durkee, LLP

(57) ABSTRACT

Methods and apparatus to provide computing, using a processor, sea clutter threshold bias values as a function of range and azimuth, receiving a first shape corresponding to a first region of sea clutter about a radar, combining the sea clutter threshold bias values with the first shape to provide non-isotropic sensitivity time control (STC) for the radar, and outputting radar return for display with sea clutter suppressed in the first shape.

19 Claims, 8 Drawing Sheets

U.S. PATENT DOCUMENTS

| | | | |
|---|---|---|---|
| 7,515,098 B1 * | 4/2009 | Garren et al. | 342/179 |
| 7,538,712 B2 * | 5/2009 | Allen et al. | 342/25 R |
| 7,598,899 B2 * | 10/2009 | Allen et al. | 342/25 R |
| 7,796,082 B2 * | 9/2010 | Wood | 342/205 |
| 2008/0191929 A1 * | 8/2008 | Wood | 342/73 |

OTHER PUBLICATIONS

The International Search Report, dated Aug. 26, 2008, PCT/US2008/053261, 3 pages.

Written Opinion of the International Searching Authority, dated Aug. 26, 2008, PCT/US2008/053261, 8 pages.

Notification Concerning Transmittal of International Preliminary Report on Patentability (Chapter 1 of the Patent Cooperation Treaty), PCT/US2008/053261 dated Aug. 20, 2009, 2 pages.

Written Opinion of the International Searching Authority, PCT/US2008/053261 dated Aug. 20, 2009, 7 pages.

Nan Xie, Henry Leung, Hing Chan, A Multiple-Model Prediction Approach for Sea Clutter Modeling, IEEE Transactions on Geoscience and Remote Sensing, vol. 41, No. 6, Jun. 2003, pp. 1491-1502.

Kun Lu, Jiong Wang and Xingzhoo Liu, A Piecewise Parametric Method Based on Polynomial Phase Model to Compensate Ionospheric Phase Contamination, Proceedings of ICASSP 2003, vol. II, p. 405-408, printed in the year 2003.

Kun Lu, Xingazhao Liu, Yongtan Liu, Ionoshperic Decontamination and Sea Clutter Suppression for HF Skywave Radars, IEEE Journal of Oceanic Engineering, vol. 30, No. 2, Apr. 2005, pp. 455-462.

PAIR file for U.S. Appl. No. 11/672,813, filed Feb. 8, 2007, file through Nov. 1, 2010, 382 pages.

File downloaded from PAIR for U.S. Appl. No. 12/971,359, filed Dec. 17, 2010, file through Jan. 19, 2011, 84 pages.

File downloaded from PAIR for U.S. Appl. No. 12/971,707, filed on Dec. 17, 2010, file through Jan. 19, 2011, 85 pages.

* cited by examiner

METHODS AND APPARATUS FOR NON-ISOTROPIC SEA CLUTTER MODELING

STATEMENT REGARDING FEDERALLY SPONSORED RESEARCH

The present invention was made with government support under Contract No. N00024-06-C-4304 awarded by the Department of the Navy. The government has certain rights in the invention.

BACKGROUND

As is known in the art, major ocean-going ships, civilian and military, have been using radars for navigation and collision avoidance for many decades. These radars display land masses, buoys, and other ships. At closer ranges and in heavier weather, sea surface return interferes with the ability to easily detect the objects the radar is designed to see. Mathematical models of sea clutter have been developed that aid in filter design, e.g., sensitivity time control (STC), to reduce the sea clutter without adversely affecting the primary performance of the radar. As is known in the art, STC is used to attenuate relatively strong signal returns from ground clutter targets in the first few range gates of the receiver. Without attenuation of such signals, the receiver would generally saturate due to the strong signal return.

The mathematical modeling of radar sea clutter has a long history. For example, one notoriously well known text discussing radar and sea clutter is Skolink, Merrill I., "Introduction to Radar Systems," and particularly the discussion of Log-FTC receivers (McGraw-Hill, NY, 1984, pp 486-489). A more modern mean sea clutter model is provided in Barton and Ward, "Handbook of Radar Measurements," Artech House, NY, 1985 (pp. 137-148). There are two complementary aspects to classic sea clutter modeling. The first aspect is the modeling of the clutter fluctuations from sample to sample. Usually, such fluctuations are modeled by a stationary stochastic process with a probability density function (pdf) that may differ significantly from author to author. A second aspect of sea clutter modeling is the nature of the mean clutter levels as a function of range.

There are disadvantages of conventional sea state modeling. For example, a reflectivity index is used in sea clutter modeling, however, this index has certain limitations. Reflectivity indexes are derived from averaging over many sea environments, many different wavelengths, and many wind aspects. In addition, below a critical grazing angle, further correction is required. Attempts to base STC on conventional sea clutter models have resulted in less than exemplary performance at short range while maintaining optimal performance at longer ranges. In the present, where there is more attention on relatively close targets/threats, where such targets can be quite small, improved STC filtering is very desirable.

In addition, conventional STC processing assumes that sea clutter is isotropic, i.e., the same in all directions. As is well known in the art, the purpose of STC processing is to de-clutter return at relatively close range. By reducing the effects of clutter, the ability of navigation and other radars to detect small cross section targets, such as small high speed boats, is enhanced.

SUMMARY

The present invention provides methods and apparatus for non-isotropic sea clutter suppression using threshold bias maps. With this arrangement, sea clutter can be more accurately processed to enhance target detection. While exemplary embodiments of the invention are shown and described in conjunction with certain radar types and sea clutter models, it is understood that the invention is applicable to radars in general for which sensitivity time control (STC) is desirable.

In one aspect of the invention, a method comprises computing, using a processor, sea clutter threshold bias values as a function of range and azimuth, receiving a first shape corresponding to a first region of sea clutter about a radar, combining the sea clutter threshold bias values with the first shape to provide non-isotropic sensitivity time control (STC) for the radar, and outputting radar return for display with sea clutter suppressed in the first shape.

The method can further include one or more of the following features: computing a maximum range of detectable sea clutter as a function of azimuth, the first shape includes an ellipse, the ellipse has a focus aligned with a location of the radar, receiving a second shape corresponding to a first portion of the region of sea clutter, the second shape is associated with a sea clutter model different than for the first shape, the second shape is contained within the first shape, the sea clutter threshold bias values are computed for range and azimuth using a polynomial having parameters of mean receiver noise, maximum range of detectable sea clutter, and peak value of sea clutter at close range.

In another aspect of the invention, a method comprises outputting display information for a radar including sea clutter with sensitivity time control (STC) off, receiving a first shape corresponding to a region of sea clutter displayed with the STC off, computing, using a processor, sea clutter threshold bias values for range and azimuth to provide non-isotropic STC, and outputting for display radar return information with sea clutter suppressed in the first shape using the sea clutter threshold bias values.

In a further aspect of the invention, a radar system comprises an antenna to receive radar return, a sensitivity time control (STC) module to provide STC processing of the radar return, the STC module including a sea clutter module to compute sea clutter threshold bias values as a function of range and azimuth, a user interface to enable a user to interact with the radar including to receive a first shape corresponding to a first region of sea clutter about the radar, a display to enable a user to perceive radar return information, and a processor to combine the sea clutter threshold bias values with the first shape to provide non-isotropic sensitivity time control (STC) for the radar, and output radar return on the display with sea clutter suppressed in the first shape.

The radar system can further include one or more of the following features: the peak sea clutter value depends upon a height of the antenna above sea level and a width of pulses transmitted by the radar, STC is adjusted when a pulse repetition interval is modified, a maximum range of detectable sea clutter as a function of azimuth is determined, the first shape includes an ellipse having a foci generally coincident with the antenna, a second shape is contained within the first shape and associate with sea clutter threshold bias values different than those for the first shape, and the sea clutter threshold bias values are computed for range and azimuth using a polynomial having parameters of mean receiver noise, maximum range of detectable sea clutter, and peak value of sea clutter at close range.

BRIEF DESCRIPTION OF THE DRAWINGS

The foregoing features of this invention, as well as the invention itself, may be more fully understood from the following description of the drawings in which.

DETAILED DESCRIPTION

Figure 1:
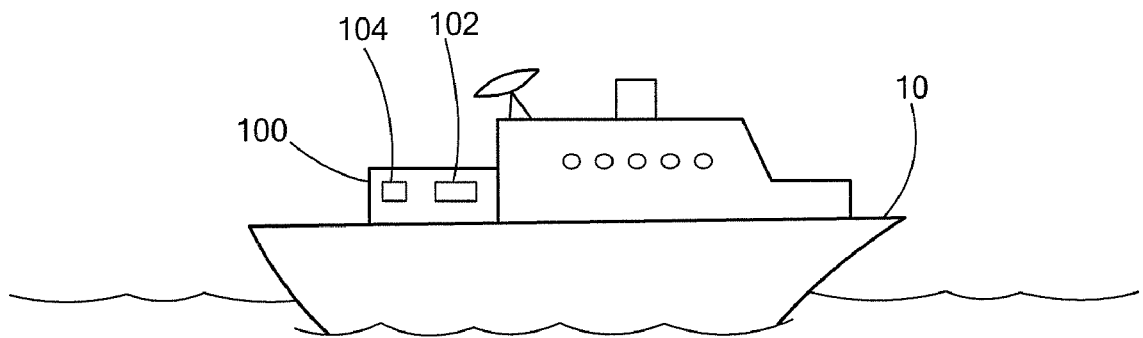
FIG. 1 is a pictorial representation of a shipboard radar system having non-isotropic STC in accordance with exemplary embodiments of the invention.

FIG. 1 shows an exemplary radar system 100 having non-isotropic sensitivity time control (STC) for sea clutter suppression in accordance with exemplary embodiments of the invention. The radar system 100 can be located on a vehicle 10, such as a ship, or at a fixed location. The radar system 100 includes a signal processing module 102 and a sea clutter processing module 104 to provide sea clutter processing, as discussed in detail below.

Figure 1A:
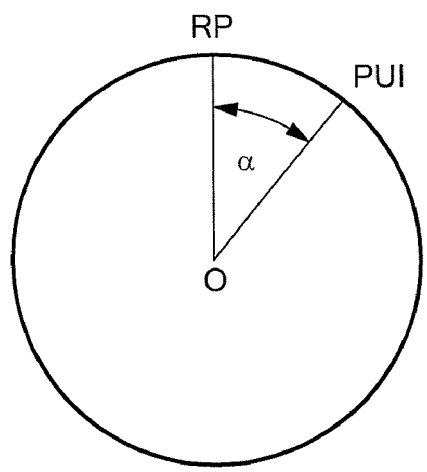
FIG. 1A is a schematic representation of azimuth for the radar system of FIG. 1.

In general, exemplary method and apparatus embodiments of the present invention include sea clutter processing related to the nature of mean clutter levels as a function of range, referred to as the range profile, as well as azimuth. It is understood that conventional sea clutter models are isotropic, i.e., do not take azimuth into account. As is known in the art, azimuth refers to an angle in a spherical coordinate system defined as the angle $\alpha$ between a reference point RP and a point of interest POI for an observer O, as shown in FIG. 1A.

Prior to describing exemplary embodiments of the invention in detail, some information is provided. The purpose of STC is to aid in the elimination of average radar signal return from the sea surface near the radar antenna. Sea clutter is modeled to enhance filter design, e.g., sensitivity time control (STC), to reduce the sea clutter without adversely affecting radar performance. STC attenuates relatively strong signal returns from ground clutter targets in the first few range gates of the receiver for avoiding saturation from strong signal return.

Figure 2:
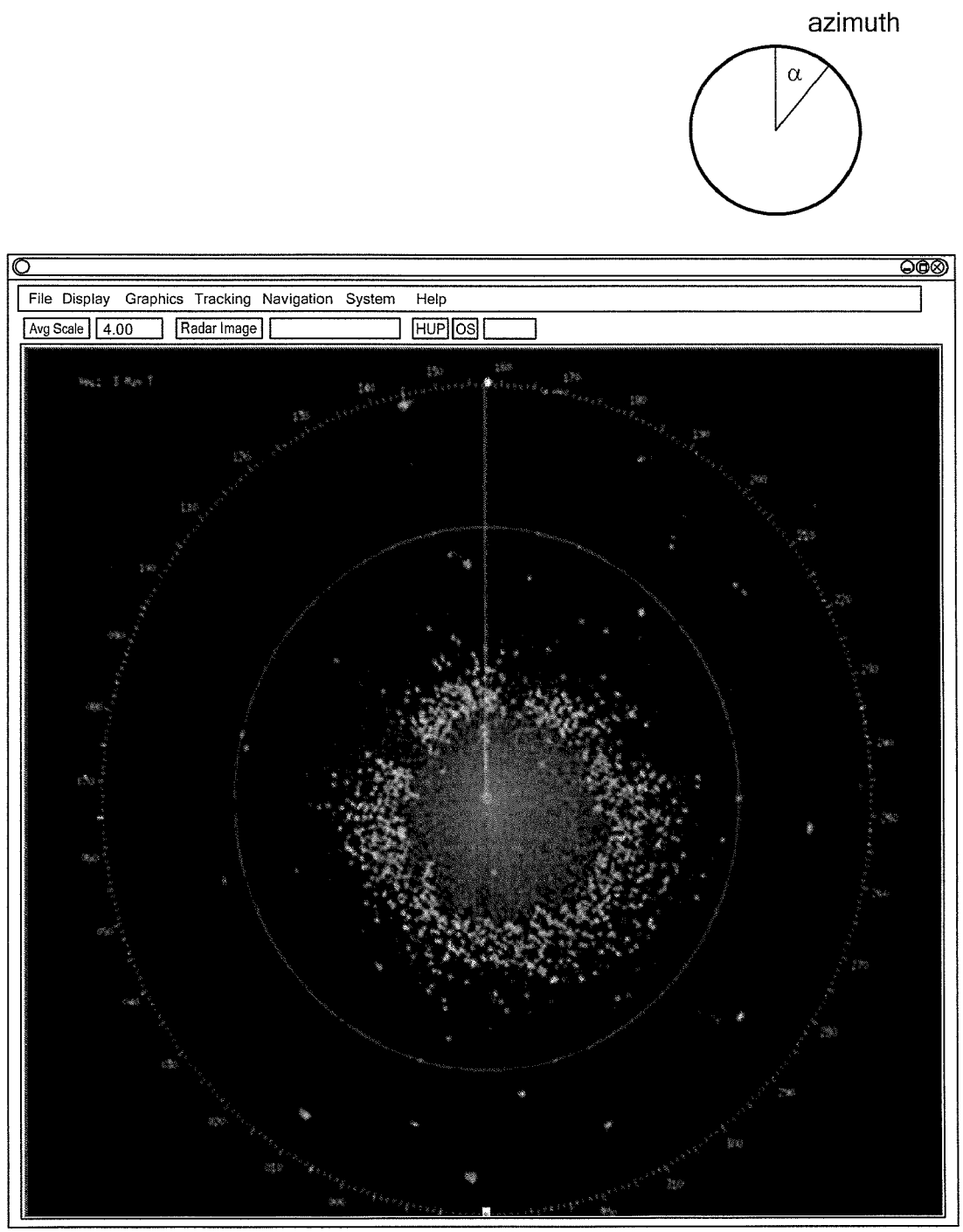
FIG. 2 is a pictorial representation of a plan position indicator (PPI) showing sea clutter return with no STC applied.

Known sea clutter models for STC are isotropic, i.e., have the same magnitude measured in all directions. An isotropic radiator radiates uniformly in all directions over a sphere centered on the source. However, as shown in FIG. 2, for example, sea clutter 10 is not isotropic. That is, as can be been the sea clutter is elongate, rather than circular. Strong winds can generate a significantly elongated sea clutter region from the perspective of the radar of interest. The illustrated return is from a navigation radar with STC turned off resulting in saturation about the radar.

In accordance with the standard Radar Equation, the average strength of sea clutter echo diminishes rapidly with increasing range from the antenna. One of the difficulties in implementing sea clutter reduction is in responding to the rapid rate of decrease in its average strength.

Figure 3:
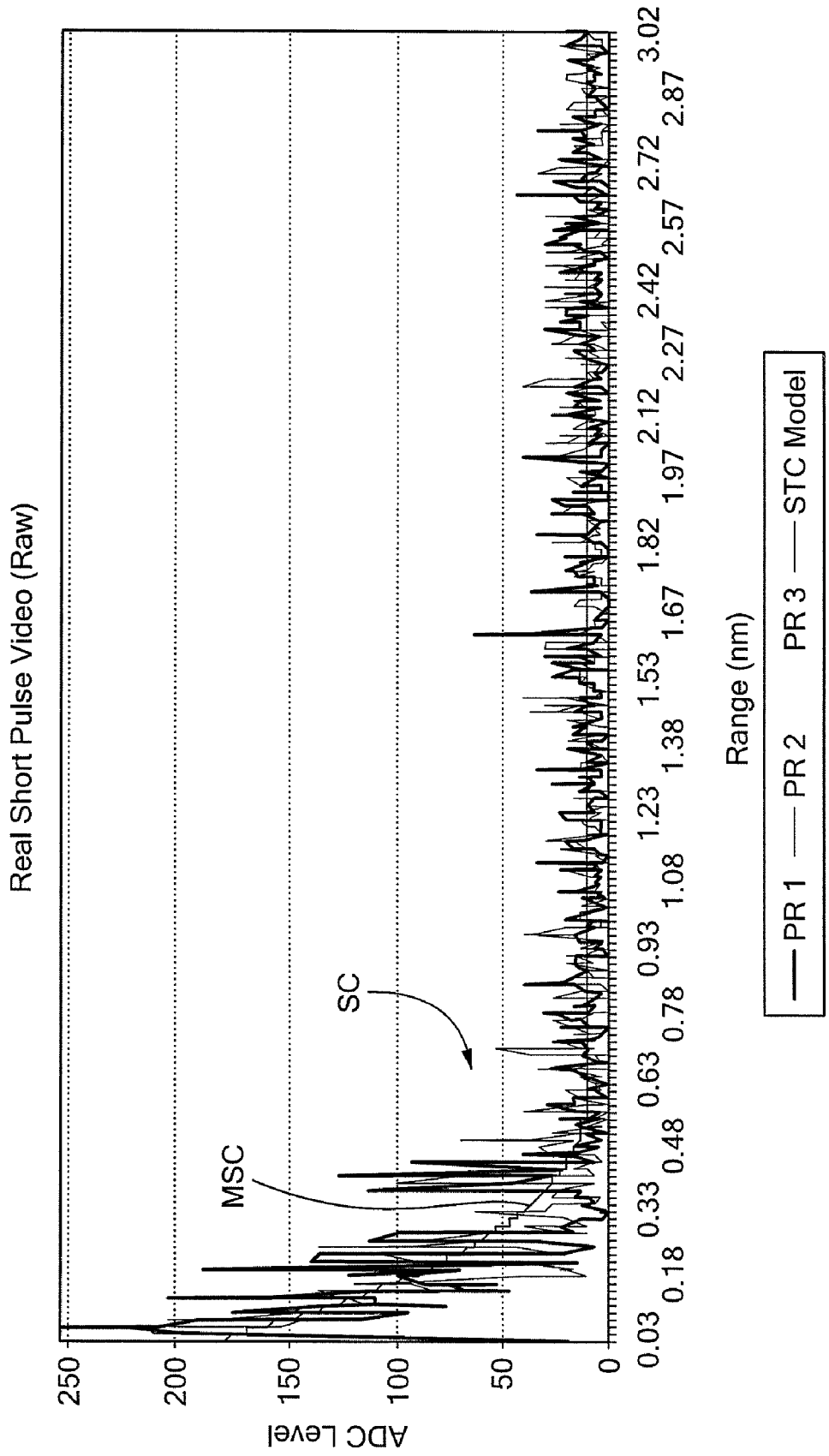
FIG. 3 is a graphical representation of recorded sea clutter return versus range.
Figure 4:
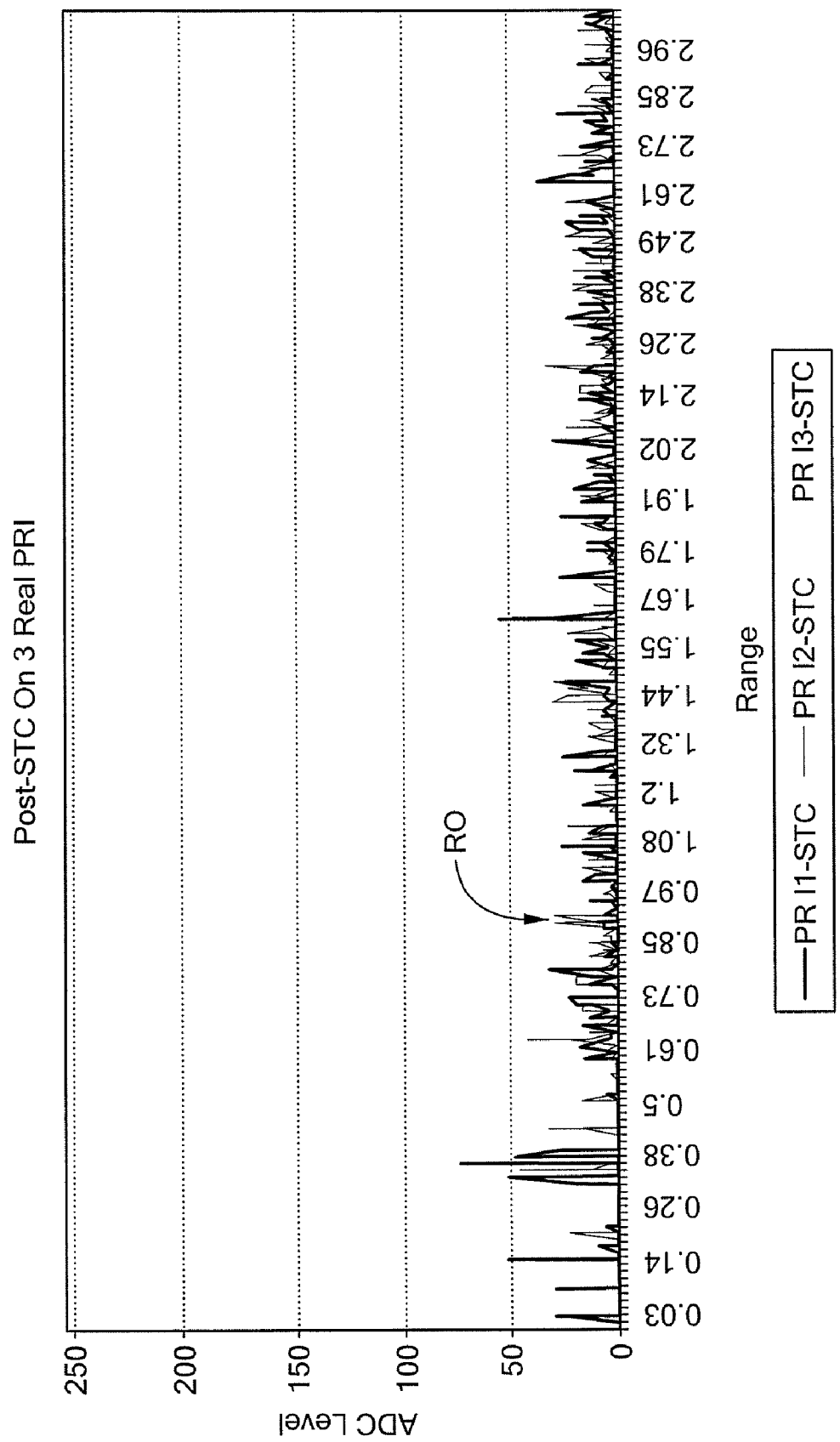
FIG. 4 is a graphical representation of a flattened sea clutter model over range.

FIG. 3 shows actual digital radar video demonstrating the rapid decrease in sea clutter signals SC for various pulse repetition interval (PRI) signals as they ultimately diminish to the low level of receiver noise. Also shown is an a priori smooth curve MSC to match the mean (average) shape of the actual sea clutter. As noted above, mathematical descriptions of such sea clutter models are well known. Subtracting the curve chosen to model the mean sea clutter (as a function of range), the STC function "flattens" the receiver output RO, as shown in FIG. 4.

In legacy analog systems, STC is performed in the receiver, as close to the radar antenna as possible since detection of targets at close range, as well as far range, drives the need for wide dynamic range in each system component downstream from the STC function.

In particular, older navigation radars typically terminate their analog video processing with a log-amp detector, which has a restricted dynamic range that hinders short-range detection. Modern designers have made the trade-off to spend more on wider dynamic range in the log-amp rather than implement STC in the Intermediate Frequency (IF) portion of the super-heterodyne receiver. Part of the reason for this "sub-optimal" implementation of STC is the difficulty in implementing arbitrarily shaped mean sea clutter curves in analog circuits controllable for changing weather conditions.

More recent systems implement STC in analog circuits on circuit card assemblies after the log-amplifier. In these implementations, a digital curve is generated to model mean sea clutter based on sea state information from a human operator. That is, the human operator selects a sea state on perceived or measured information. The curve is transferred to a Digital to Analog Converter (DAC) whose output voltage controls a variable attenuator acting on the input analog video. This attenuation approach to STC is generally referred to as "Multiplicative STC." So-called "Subtractive STC" is shown in FIG. 4.

One flaw in traditional STC processing is that the curve selected by an operator input is fixed for all azimuth angles of antenna orientation relative to the sea, i.e., the sea clutter model is isotropic. However, it is well-known that radar sea clutter strength varies significantly with changing aspect angles from the antenna into the waves of higher sea states, e.g., larger waves. FIG. 2 depicts a rather calm sea state. Higher sea states can further elongate the sea clutter.

In one aspect, a radar system includes non-isotropic STC in accordance with exemplary embodiments of the invention. By providing non-isotropic STC, sea clutter can be more accurately suppressed thereby enhancing the ability of a radar to detect targets, and particularly, smaller targets relatively close to the radar.

Figure 5:
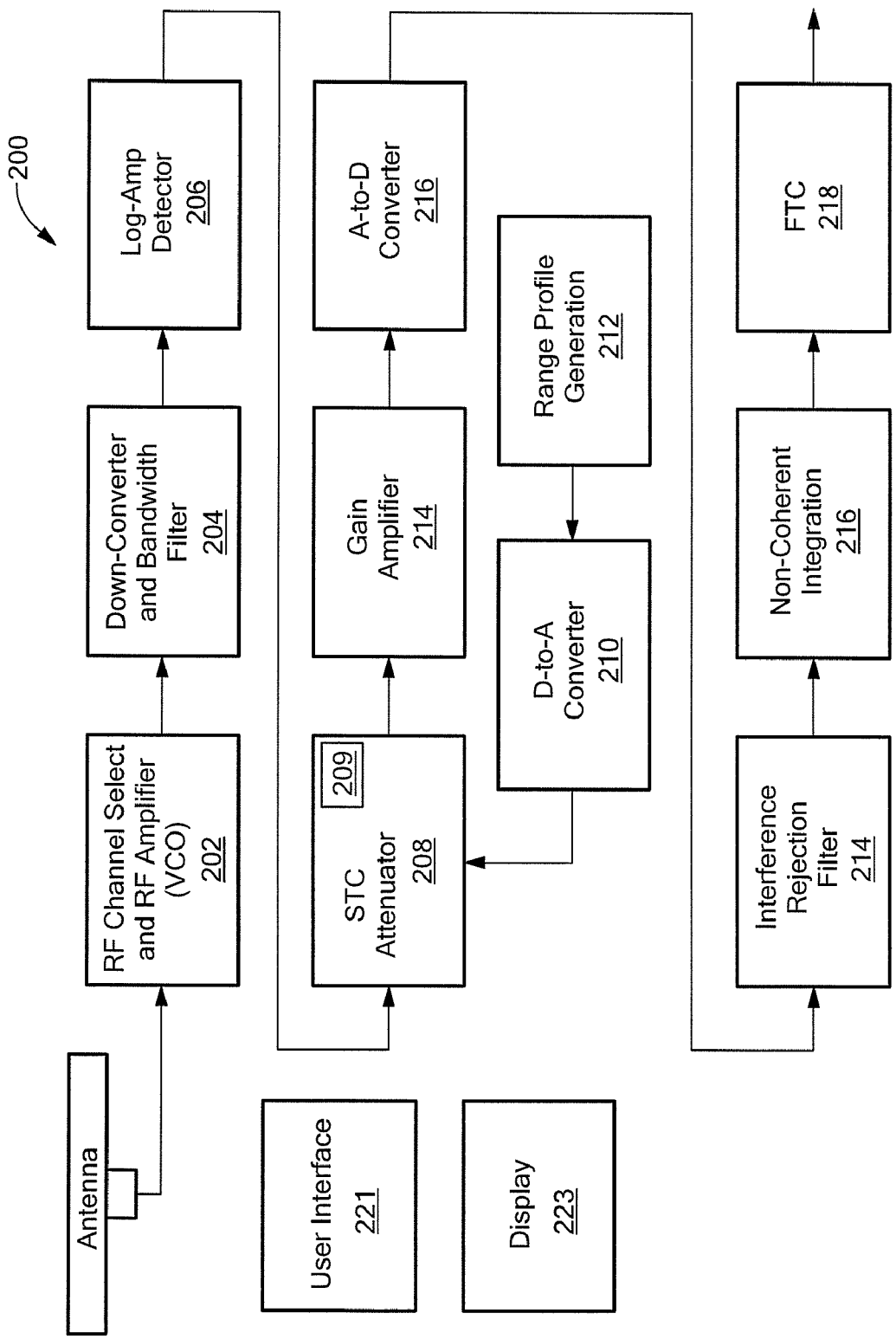
FIG. 5 is a schematic representation of a exemplary radar system providing non-isotropic STC.

FIG. 5 shows an exemplary radar system 200 to provide non-isotropic STC in accordance with exemplary embodiments of the invention. The system 200 includes a RF channel select and RF amplifier 202 coupled to a down-converter and bandwidth filter 204 proving input to a Log-Amp detector 206.

A STC attenuator 208 includes a sea clutter module 209 to provide non-isotropic processing in accordance with exemplary embodiments of the invention, as described more fully below. A range profile generation module 210 provides data to a Digital-to-Analog Converter module 212, which provides information to the STC attenuator 208.

A gain amplifier 214 receives output from the STC attenuator 208 and provides data for digitization by an Analog-to- Digital converter module 216. This data then passes through a interference rejection filter module 214, a non-coherent integration module 216, and an FTC module 218. An operator can interact with the system via a user interface 221. For example, a user can adjust bias settings to optimize what is shown on a display 223, as discussed more fully below.

Figure 6:
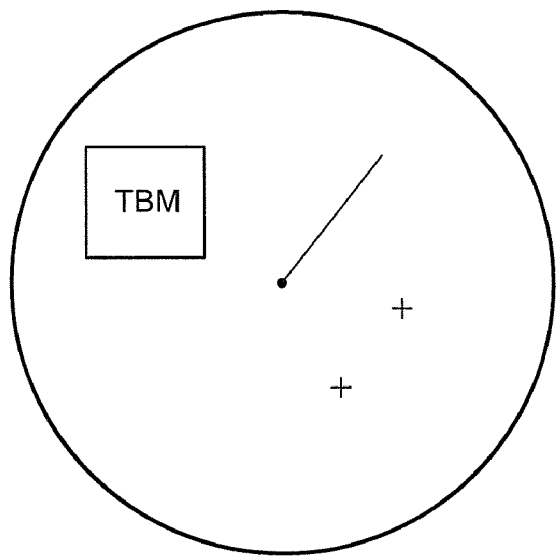
FIG. 6 is a pictorial representation of a radar return display with a prior art threshold bias map.

A radar system can include threshold bias maps (TBMs), which can be generated graphically by human operators. While viewing the PPI (plan position indicator), an operator can spot an area of radar coverage with a higher than desired false alarm rate and draw a graphic zone (e.g., circle or rectangle) around that area, as shown in FIG. 6. The operator then assigns to that graphic zone TBM a threshold bias index corresponding to a threshold bias value that will eliminate false alarms. That is, the operator manually adjusts the threshold bias index until it 'looks good.'

The TBMs enable operators to compensate for the non-stationarity of radar interference. The system stores a table of values $N(\alpha, i)$ each value of $\alpha$ corresponding to an antenna azimuth, each i corresponding to a range index, and each N being one of 16, for example, possible "Bias" values, B.

Using the TBMs, exemplary detection logic is set forth as follows:

$$v_i > \check{N}_i \cdot M + B_{N(\alpha,i)}$$

or $$v_i > \check{N}_i + T + B_{N(\alpha,i)}$$

Using the TBMs, an operator can desensitize the radar to local features, such as land clutter when the radar is not on the move by selecting a bias level for the TBM.

In one aspect of the invention, non-isotropic sea clutter STC can be provided using TBMs, as described more fully below. The system receives a stream of digital range bins, $\{v_i: i=1, \ldots, N_{rb}\}$ that represent the radar signal strength at range index, i. A sliding window estimation process, for example, determines an estimate of the background interference (e.g., noise, rain clutter, etc.) locally around each $v_i$. Sliding window estimation is well known to one of ordinary skill in the art. The local interference estimate is denoted by and the basic thresholding is a check to see if for every i:

$$v_i > \check{N}_i * M$$

or, $$v_i > \check{N}_i + T,$$

where M or T are values used to protect the radar false alarm rate. M and T are dependent on the probability model for the fluctuations of the interference. Typically M and T are constants. A flaw of traditional radar is the assumption that the background interference is a stationary stochastic process. This justifies the lack of a range-dependent index or subscript on M and T above.

In one particular embodiment, a cubic polynomial is used for the STC curve, such as the curve disclosed in U.S. patent application Ser. No. 11/672,813, of Thomas Wood filed on Feb. 8, 2007, which is incorporated herein by reference. The curve can be expressed as follows:

$$STC_i = \begin{cases} \mu + \frac{\xi - \mu}{h^3}(h-i)^3, & \text{if } i \leq h \\ \mu, & \text{if } i > h \end{cases}$$

where i is the range index (variable), h is the maximum range at which sea clutter is presently detectable, $\mu$ is the mean noise level in the radar, and $\xi$ is the peak value of sea clutter at close range to the antenna. The values of $\mu$ and $\xi$ depend primarily on the pulsewidth mode setting. The value of h (also called the clutter horizon) depends on the pulsewidth mode in use, the sea state, and the aspect angle of the antenna and the waves.

Figure 7:
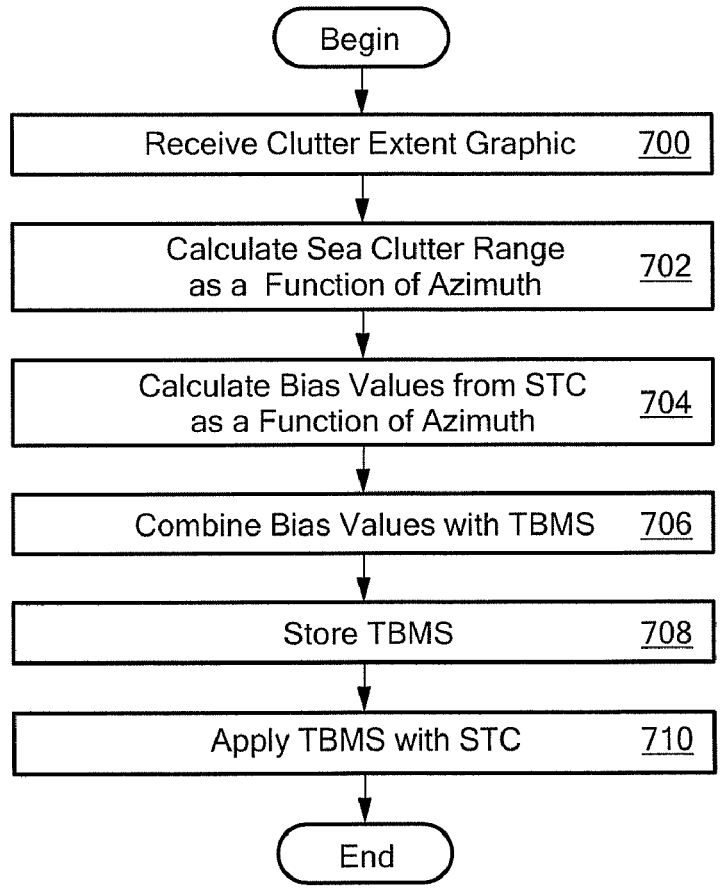
FIG. 7 is a flow diagram showing an exemplary sequence of steps for implementing non-isotropic STC processing.
Figure 7A:
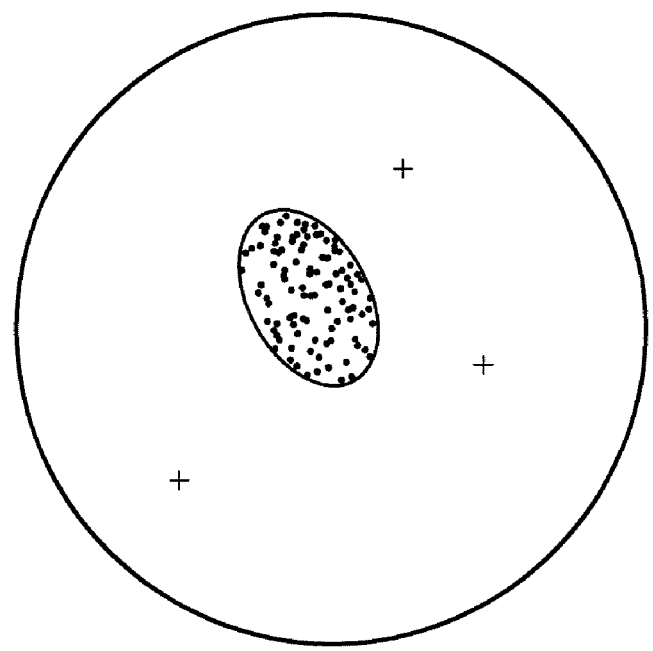
FIG. 7A is a pictorial representation of signal return with STC turned off.
Figure 7B:
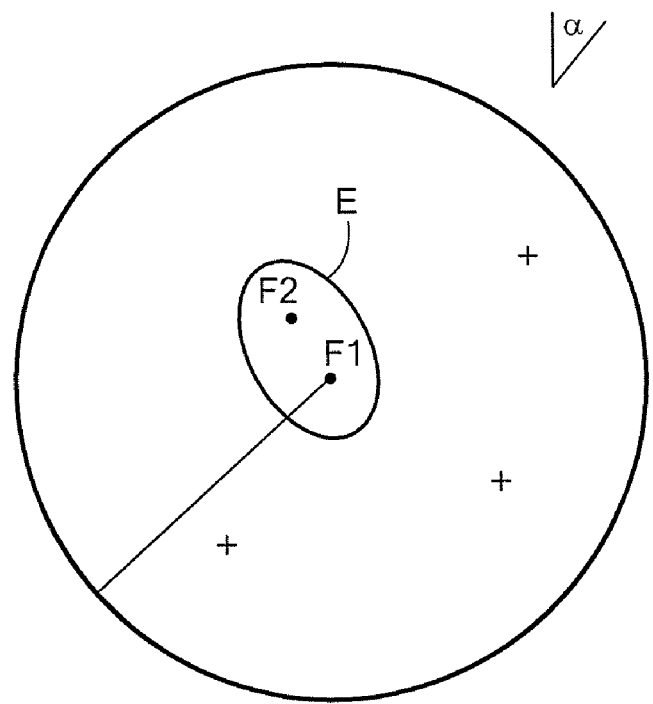
FIG. 7B is a pictorial representation of a sea clutter suppression region to provide non-isotropic STC processing.

FIG. 7 shows exemplary processing associated with non-isotropic sea clutter STC in accordance with exemplary embodiments of the invention. In step 700, an operator draws a closed shape, such as an ellipse, about an area of sea clutter. For example, while looking at the PPI with STC turned off, as shown in FIG. 7A, an operator can draw an ellipse E around the perceptible sea clutter for designation as a sea clutter extent graphic, as shown in FIG. 7B. As described more fully below, sea clutter suppression can be optimized within the shape to enhance target detection. The user interface of the radar enables the system to receive the shape generated by the operator. In one embodiment, the ellipse has a foci F1 aligned with the position of the radar. In an alternative embodiment, the system can automatically define a sea clutter TBM.

In step 702, since the system should compensate for sea clutter differently at different azimuths, one can make the clutter horizon, h, a function of azimuth, $h(\alpha)$. Since, STC should not effect the performance against receiver noise, bias levels $B_{N(\alpha, i)}$ can be selected in step 704 as follows:

$$B_{N(\alpha,i)} = \begin{cases} \frac{\xi}{h(\alpha)^3}(h(\alpha) - i)^3, & \text{if } i \leq h(\alpha) \\ 0, & \text{if } i > h(\alpha), \end{cases}$$

where for a given range index i, and azimuth index $\alpha$, the system can look up a bias index, $N(\alpha, i)$, which is used to look up a threshold bias value, $B_{N(\alpha, i)}$ for sea clutter, and $h(\alpha)$ is a maximum range of detectable sea clutter as a function of azimuth.

In step 706, the bias values can be combined with the shape, e.g., ellipse, drawn by the operator, and stored in step 708. In one embodiment, an azimuth sector granualarity $1/1024^{th}$ of a circle. The distance from the origin to the edge of the sea clutter extent graphic at azimuth, $\alpha$, can be measured and set to $h(\alpha)$. With the three cubic polynomial model parameters known for each azimuth, the system can store the STC bias values. In step 710, the system can apply the STC bias values for the locations within the shape to provide non-isotropic sea clutter STC.

Figure 7C:
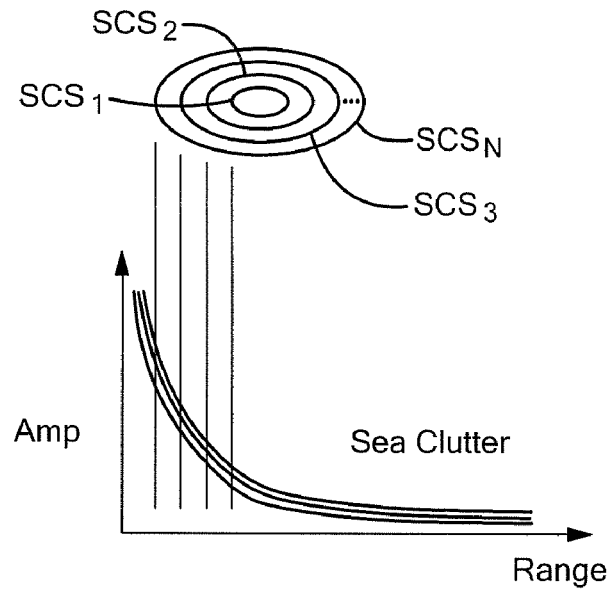
FIG. 7C is a pictorial representation of multiple shapes used for STC processing.

In one embodiment, multiple shapes, shown as ellipses SCS1-N, can be generated each having associated bias values for range and azimuth, as shown in FIG. 7C. By providing multiple shapes, an operator can optimize sea clutter suppression within the largest outer shape using smaller shapes contained in a larger shape. Each shape can have bias values associated with a different sea clutter model. In other embodiments, ellipses have different eccentricities. In further embodiments, different shapes are used.

It is understood that the system can run an Automated Gain/Bias Calibration during magnetron warm-up, for example, to determine the value of mean receiver noise, $\mu$, for each radar (pulsewidth) mode. When the radar is operational (transmitting) and the mode is changed, the system can adjust STC by looking into a table of calibrated values for $\mu$. Similarly, the peak clutter value $\xi$ can be calibrated during radar installation. The peak sea clutter value $\xi$ depends on the antenna installation height above the water and the pulsewidth mode in use.

While exemplary embodiments of the invention are shown in conjunction with a particular cubic sea clutter model, it is understood that any suitable sea clutter model can be used. It is further understood that any practical radar can be provided with non-isotropic STC without departing from the invention.

Figure 8:
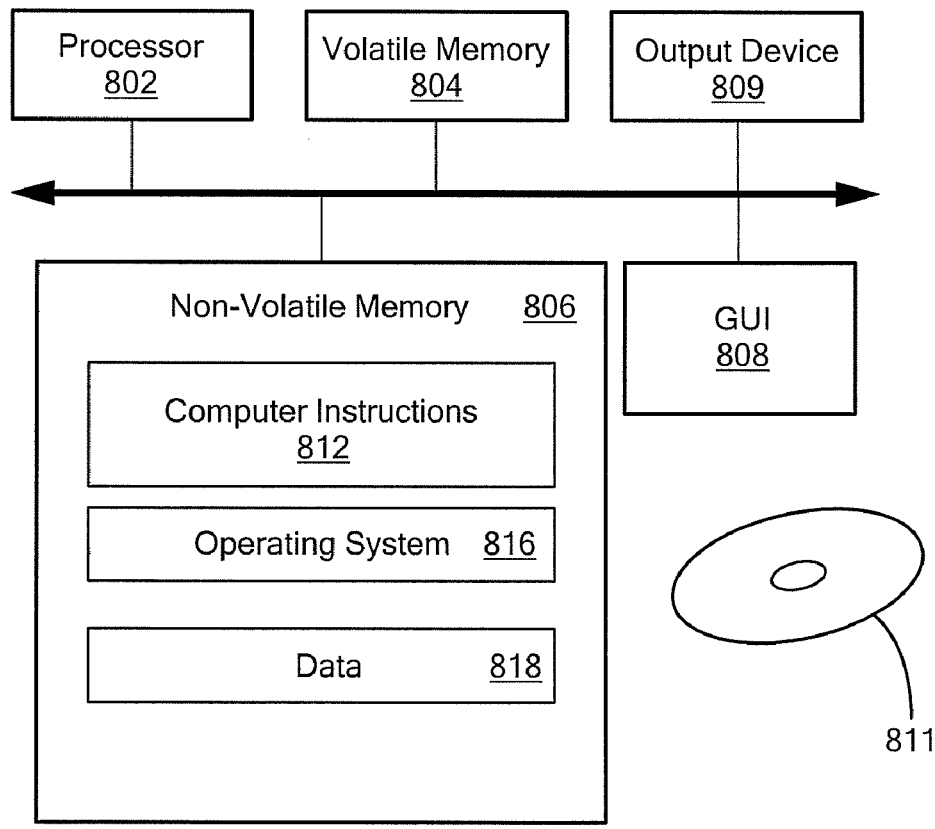
FIG. 8 is a schematic representation of an exemplary computer-based implementation of non-isotropic STC.

FIG. 8 shows an exemplary computer implementation to provide at least part of non-isotropic STC processing in accordance with exemplary embodiments of the invention. A computer includes a processor 802, a volatile memory 804, a non-volatile memory 806 (e.g., hard disk), a graphical user interface (GUI) 808 (e.g., a mouse, a keyboard, a display, for example) and an output device 809. The non-volatile memory 806 stores computer instructions 812, an operating system 816 and data 818, for example. In one example, the computer instructions 812 are executed by the processor 802 out of volatile memory 804 to perform all or part of the STC processing.

Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing to generate output information.

The system may be implemented, at least in part, via a computer program product 811, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing. Processing may also be implemented as a machine-readable storage medium 811, configured with a computer program, where upon execution, instructions in the computer program cause the computer to operate. While exemplary embodiments of the invention are shown having illustrative partitions between hardware and software, it is understood that other configurations and partitions will be readily apparent to one of ordinary skill in the art.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
computing, using a computer processor, sea clutter threshold bias values as a function of range and azimuth;
receiving a first shape corresponding to a first region of sea clutter about a radar;
combining the sea clutter threshold bias values with the first shape to provide non-isotropic sensitivity time control (STC) for the radar; and
outputting radar return for display with sea clutter suppressed in the first shape.

2. The method according to claim 1, further including computing a maximum range of detectable sea clutter as a function of azimuth.

3. The method according to claim 1, wherein the first shape includes an ellipse.

4. The method according to claim 3, wherein the ellipse has a focus aligned with a location of the radar.

5. The method according to claim 1, further including receiving a second shape corresponding to a first portion of the region of sea clutter.

6. The method according to claim 5, wherein the second shape is associated with a sea clutter model different than for the first shape.

7. The method according to claim 5, wherein the second shape is contained within the first shape.

8. The method according to claim 1, wherein the sea clutter threshold bias values are computed for range and azimuth using a polynomial having parameters of mean receiver noise, maximum range of detectable sea clutter, and peak value of sea clutter at close range.

9. A method, comprising:
outputting display information for a radar including sea clutter with sensitivity time control (STC) off;
receiving a first shape corresponding to a region of sea clutter displayed with the STC off;
computing, using a computer processor, sea clutter threshold bias values for range and azimuth to provide non-isotropic STC; and
outputting for display radar return information with sea clutter suppressed in the first shape using the sea clutter threshold bias values.

10. The method according to claim 9, further including receiving a second shape and computing sea clutter threshold bias values for range and azimuth for the second shape that are different than the sea clutter threshold bias values for the first shape.

11. The method according to claim 9, wherein the sea clutter threshold bias values are computed as:

$$B_{N(\alpha,i)} = \begin{cases} \frac{\xi}{h(\alpha)^3}(h(\alpha)-i)^3, & \text{if } i \leq h(\alpha) \\ 0, & \text{if } i > h(\alpha), \end{cases}$$

where for a given range index i, and azimuth index $\alpha$, a bias index, $N(\alpha, i)$, is used to look up a threshold bias value $B_{N(\alpha, i)}$ for sea clutter, and $h(\alpha)$ is a maximum range of detectable sea clutter as a function of azimuth.

12. A radar system, comprising:
an antenna to receive radar return;
an sensitivity time control (STC) module to provide STC processing of the radar return, the STC module including a sea clutter module to compute sea clutter threshold bias values as a function of range and azimuth;

a user interface to enable a user to interact with the radar including to receive a first shape corresponding to a first region of sea clutter about the radar;

a display to enable a user to perceive radar return information;

a processor to combine the sea clutter threshold bias values with the first shape to provide non-isotropic sensitivity time control (STC) for the radar, and output radar return on the display with sea clutter suppressed in the first shape.

13. The system according to claim 12, wherein the peak sea clutter value depends upon a height of the antenna above sea level and a width of pulses transmitted by the radar.

14. The system according to claim 12, wherein STC is adjusted when a pulse repetition interval is modified.

15. The system according to claim 12, wherein a maximum range of detectable sea clutter as a function of azimuth is determined.

16. The system according to claim 12, wherein the first shape includes an ellipse having a foci generally coincident with the antenna.

17. The system according to claim 12, wherein a second shape is contained within the first shape and associate with sea clutter threshold bias values different than those for the first shape.

18. The system according to claim 12, wherein the sea clutter threshold bias values are computed for range and azimuth using a polynomial having parameters of mean receiver noise, maximum range of detectable sea clutter, and peak value of sea clutter at close range.

19. A method, comprising:

computing sea clutter threshold bias values for range and azimuth to provide non-isotropic sensitivity time control (STC) for suppressing sea clutter in a first region.

* * * * *